United States Patent [19]

Baek

[11] Patent Number: 5,796,809

[45] Date of Patent: Aug. 18, 1998

[54] TECHNIQUE FOR CONTROLLING RING VOLUME AND SELECTIVELY RECEIVING MESSAGES BY FACSIMILE

[75] Inventor: Nam-Dae Baek, Daegu, Rep. of Korea

[73] Assignee: SamSung Electronics Co., Ltd., Suwon, Rep. of Korea

[21] Appl. No.: 777,712

[22] Filed: Dec. 20, 1996

[30] Foreign Application Priority Data

Dec. 23, 1995 [KR] Rep. of Korea ............... 1995/55746

[51] Int. Cl.[6] .............................. H04M 11/00; H04N 1/32
[52] U.S. Cl. .............................. 379/100.06; 358/468
[58] Field of Search .................. 379/100.01, 100.06, 379/100.14–100.17, 373–375, 110.01, 93.37; 358/400, 434–439, 442, 468

[56] References Cited

U.S. PATENT DOCUMENTS

| | | |
|---|---|---|
| 3,033,941 | 5/1962 | Bell et al. . |
| 4,409,439 | 10/1983 | Gamble . |
| 4,429,188 | 1/1984 | Allen . |
| 4,446,334 | 5/1984 | Groff . |
| 4,644,106 | 2/1987 | Yeh . |
| 4,791,664 | 12/1988 | Lutz et al. . |
| 4,856,056 | 8/1989 | Yeh . |
| 4,926,470 | 5/1990 | Sanford . |
| 5,127,049 | 6/1992 | Sabo . |
| 5,323,456 | 6/1994 | Oprea . |
| 5,337,350 | 8/1994 | Kuwahara . |
| 5,499,287 | 3/1996 | Campbell et al. . |
| 5,508,824 | 4/1996 | Baba ........................ 379/100.14 |

*Primary Examiner*—Wing F. Chan
*Attorney, Agent, or Firm*—Robert E. Bushnell, Esq.

[57] ABSTRACT

A technique for controlling a ring volume and selectively receiving messages by facsimile, includes: establishing a personal reception mode; determining if the personal reception mode has been established when a ringing signal comes into a receiving-side facsimile machine; and performing the personal reception mode operations provided it has been established.

6 Claims, 3 Drawing Sheets

5,796,809

1

TECHNIQUE FOR CONTROLLING RING VOLUME AND SELECTIVELY RECEIVING MESSAGES BY FACSIMILE

CLAIM OF PRIORITY

This application makes claims all benefits accruing under 35 U.S.C. §119 from an application for METHOD OF CONTROLLING RING VOLUME AND SELECTIVELY RECEIVING MESSAGES BY FACSIMILE earlier filed in the Korean Industrial Property Office on 23 Dec. 1995 and there duly assigned Ser. No. 55746/1995.

BACKGROUND OF THE INVENTION

1. Field of the Invention

The present invention relates generally to a facsimile machine. More particularly, it relates to a technique for controlling a ring volume for incoming calls from transmitters selected by a receiver in advance on establishing a personal reception mode and for selectively receiving facsimile messages.

2. Description of the Related Art

In line with the remarkable development of telecommunications systems, the demand for various communication services is on the increase, and there are variety of techniques for setting up facsimile connections.

According to an earlier method of communication using a facsimile machine, when a facsimile transmitter sends a facsimile signal to a facsimile receiver, a ring signal is sent as is through the telephone lines by the telephone central office. The receiving machine counts the number of ring signals and automatically converts to a reception mode, thereby allowing the reception of documents.

Thus, a facsimile receiver may be troubled with unsolicited junk mail (such as advertising circulars) that are sent to the receiver via facsimile. Besides, the earlier facsimile machines are incapable of either emitting ringing signals only when incoming messages from transmitters previously selected by the receiver are received by the receiving machine, or producing ringing signals at a selected volume at midnight in order to keep the machine owners' personal matters and relationships secret.

The patents to Gamble, Allen, Groff, Lutz et al., Sanford, and Sabo, U.S. Pat. Nos. 4,409,439, 4,429,188, 4,446,334, 4,791,664, 4,926,470, and 5,127,049, entitled Controllable Telephone Call Annunciator, Telephone Call Screener, Telephone Number Coding Device, System For Selectively Receiving Telephone Calls, Telephone Call Screening Circuit, and Coded Phone Security System respectively, each disclose telephone systems in which a caller must provide an additional code in order for ringing signal to be provided to the called party.

The two patents to Yeh, U.S. Pat. Nos. 4,856,056 and 4,644,106, both entitled Apparatus for Timely Controlling The Sound Characteristic Of A Signaling Means Of A Voice Communication Device, each disclose a telephone apparatus in which the loudness of the ringing signal can be programmed. Similarity, the patents to Bell et al. and Oprea, U.S. Pat. Nos. 3,033,941 and 5,323,456, respectively entitled Means For Altering Telephone Operation and Digitally Controlled Ringer Signal Generations, each also disclose programming the ringer loudness.

Lastly, the patents to Kuwahara and Campbell et al., U.S. Pat. Nos. 5,337,350 and 5,499,287, respectively entitled Facsimile Apparatus With Telephone System, and Fax-Telephone Interface Circuit, each disclose facsimile machine arrangements in which the incoming call is directed to a facsimile machine upon the detection of the proper code signal or provides a ring signal if the call is determined not to be a facsimile call.

It is noted that none of the cited references teaches or suggests the recited combination of the present invention.

SUMMARY OF THE INVENTION

The present invention is directed to a technique for controlling a ring volume and selectively receiving messages by facsimile which substantially obviates the above-described problems due to limitations and disadvantages of the related art.

It is an objective of the present invention to provide a technique for controlling a ring volume for incoming calls from transmitters selected by a receiver on establishing a personal reception mode and for selectively receiving printed messages by facsimile.

In order to realize the above object, the present invention discloses a technique for controlling a ring volume and selectively receiving messages by facsimile, including the steps of establishing a personal reception mode; determining if the personal reception mode is established when a ringing signal comes into a receiving-side facsimile machine; and performing the personal reception mode provided it is established.

As another aspect of the present invention, there is disclosed a technique for establishing a personal reception mode for controlling a ring volume and selectively receiving messages by facsimile, including the steps of selecting a ring volume when there is a key input for establishing a personal reception mode; and inputting and setting a reception password.

As still another aspect of the present invention, there is disclosed a technique for performing a personal reception mode by a facsimile machine, including the steps of determining if an incoming call has been received, on presetting the personal reception mode; receiving a reception password from a transmitter if there is an incoming call, and determining whether or not the reception password and a previously-recorded password correspond; and transmitting a dummy call at a selected volume if the reception password and the previously-recorded password correspond.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Reference will now be made in detail to the preferred embodiment of the present invention, examples of which are illustrated in the accompanying drawings.

Figure 1:
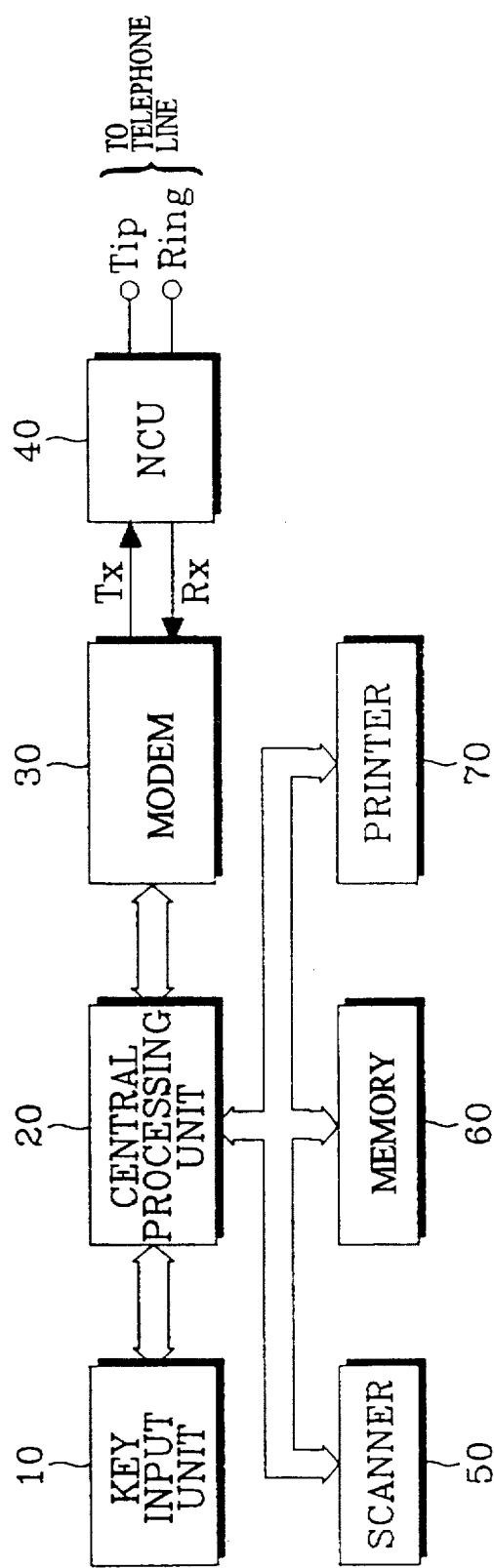
FIG. 1 is a block diagram of a facsimile machine in accordance with the present invention.

As shown in FIG. 1, the facsimile machine includes: a central processing unit (CPU) 20 having a read only memory and a random access memory and having control of the overall operation of the facsimile machine according to a predetermined program; a memory 60 in which data may be stored and from which the same data may be retrieved under the control of the CPU 20; a key input unit 10 having a set of keys for feeding information into the facsimile machine; a scanner 50 for converting information on a page into corresponding electrical signals and inputting them to the CPU 20, and a modem (modulator/demodulator) 30, controlled by the CPU 20, for converting an output of the CPU 20 into corresponding analog data, and for converting analog input data into corresponding binary digital data.

The facsimile machine also includes a network control unit (NCU) 40, actuated under the control of the CPU 20, for establishing the communications link with a telephone line, and interfacing the modem 30 with the telephone line, and a printer for printing out input data under the control of the CPU 20.

Figure 2:
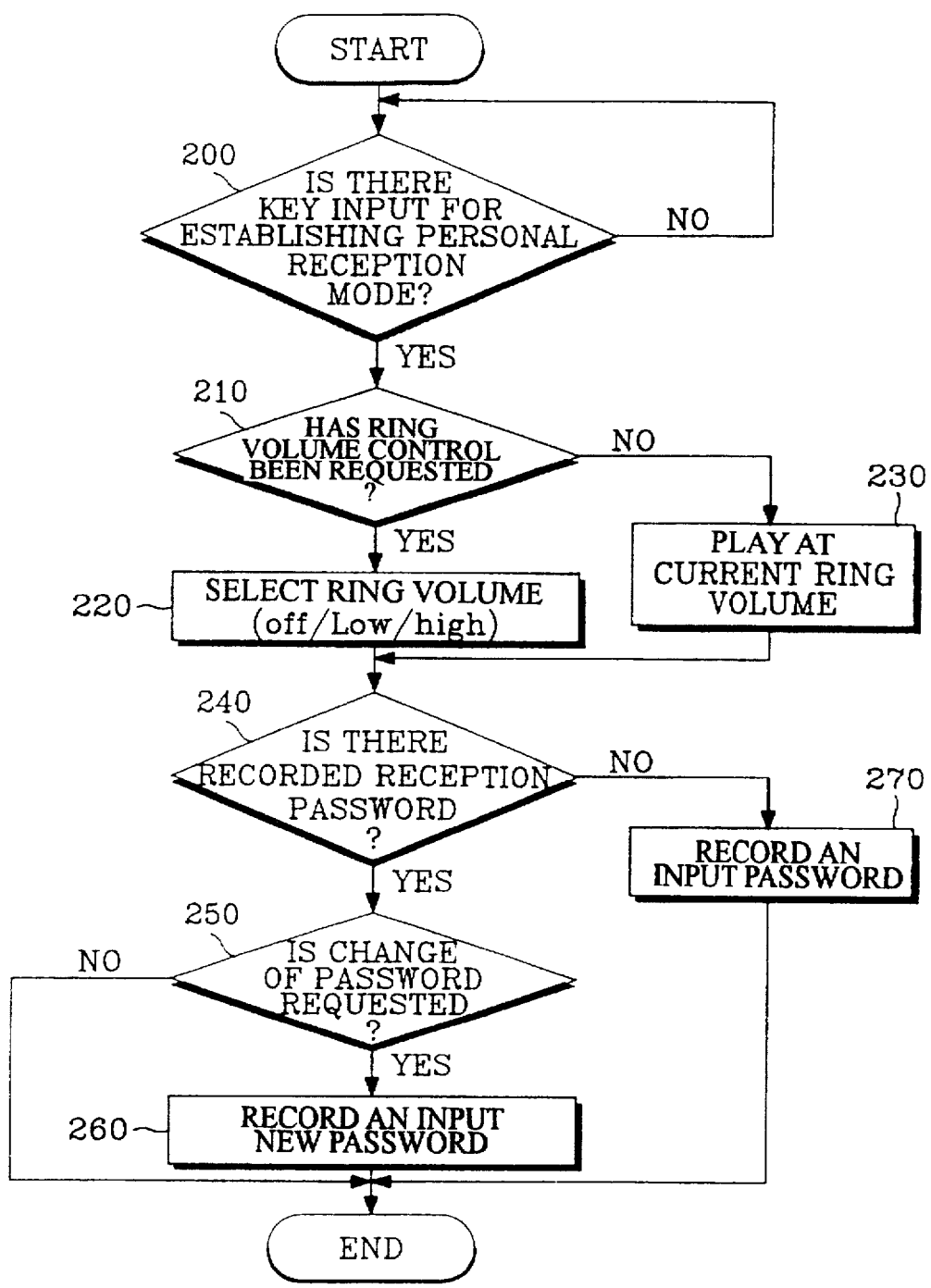
FIG. 2 is a flowchart showing the steps of establishing a personal reception mode in accordance with the present invention.

FIG. 2 shows the steps of establishing a personal reception mode in accordance with the present invention. The personal reception mode includes a ring volume control mode and a reception password record mode.

Figure 3:
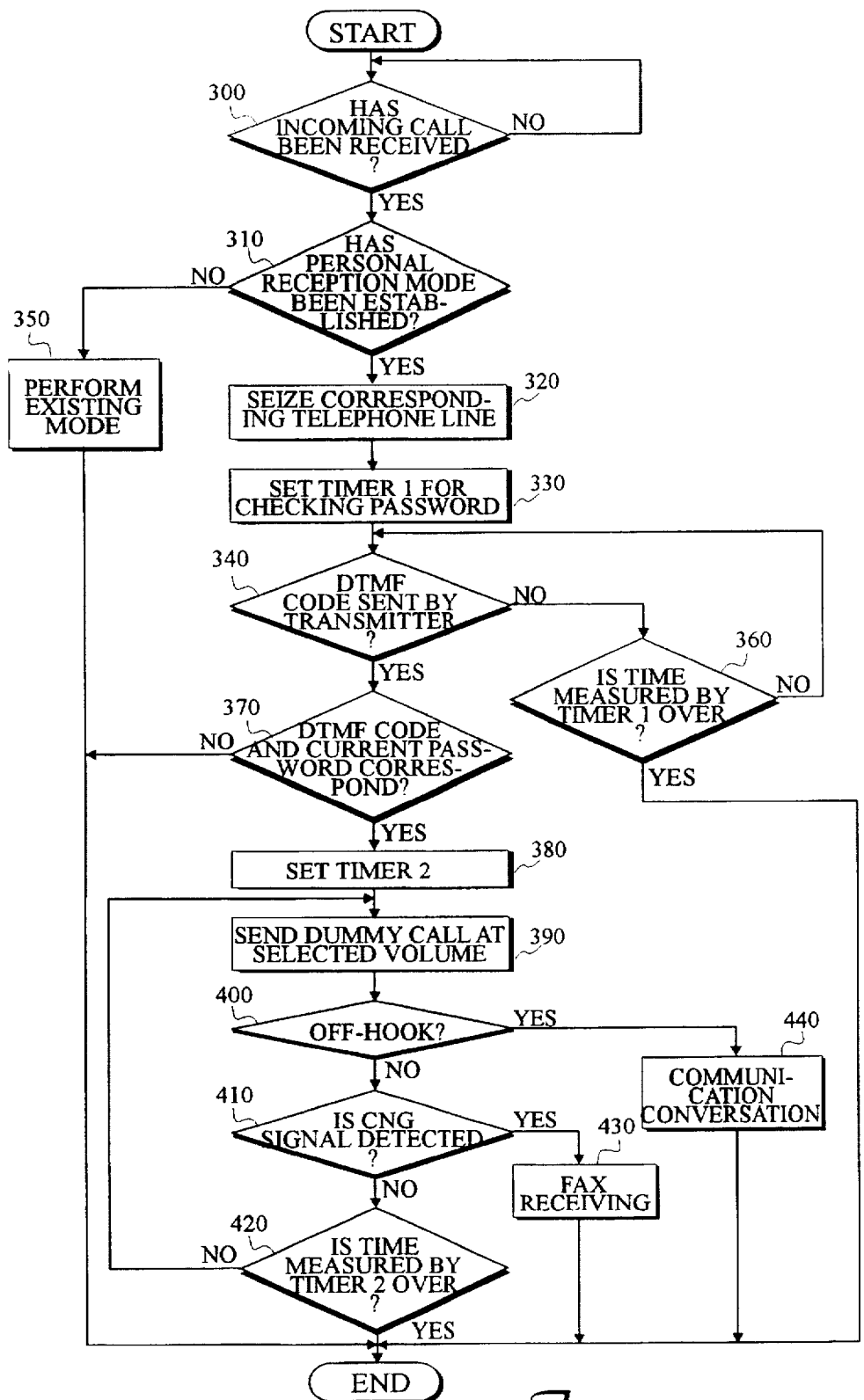
FIG. 3 is a flowchart showing the steps of managing the execution of the personal reception mode when an incoming call comes into a receiving machine.

FIG. 3 shows the steps of managing the execution of the personal reception mode when an incoming call comes into a receiving machine.

When an incoming call comes into the receiving machine, a determination is made as to whether or not it is in the personal reception mode. If the personal reception mode has been established, a reception password confirm mode and a ring volume control mode are then carried out.

The operation of the present invention will be described in detail with reference to FIGS. 1 to 3.

Referring first to FIG. 2, the CPU 20 determines (S200) if there is a key input for establishing a personal reception mode. If there is the key input, the CPU 20 determines (S210) if the ring volume control has been requested. If the ring volume control has been not requested, the CPU 20 sets a previously-selected ring volume, and determines (S240) if there is a recorded reception password.

If the ring volume control has been requested, the CPU 20 produces a control signal to a corresponding section to set a ring volume as a user desires. There are off, low and high levels in the ring volume. Subsequently, the CPU 20 determines if there is a recorded reception password. If the CPU 20 determines that there is no recorded password, it records an (S270) input password, and then completes the program. On the contrary, if the CPU 20 determines that there is a recorded password, it detects (S250) whether or not there is a request for a change of the current reception password. If the CPU 20 determines that there is no request for a change of the current password, it completes the program. If the CPU 20 determines that there is such a request, it records (S260) the change of the current password to a new password, and then completes the program.

Turning to FIG. 3, the CPU 20 determines (S300) whether or not an incoming call has come into the receiving set. If the CPU 20 has determined that an incoming call has been received, it detects (S310) if a personal reception mode has been established through the memory unit 60. If the CPU 20 determines that the personal reception mode has not been established, it allows (S350) the performance of the already-established mode. If the CPU 20 determines that the personal reception mode has been established, it seizes (S320) the corresponding telephone line and lets the transmitter have an audible confirmation. The CPU 20 then sets (S330) a timer 1 for checking out a password sent from the transmitter. The checking time of the timer 1 is 10 to 20 seconds.

Subsequently, the CPU 20 determines (S340) if there is a DTMF code sent by the transmitter using the timer 1. If there is no DTMF code from the transmitter, the CPU 20 determines (S360) whether or not the time measured by the timer 1 is over. If so, the CPU 20 completes the program. If the output does not result therefrom, the CPU 20 returns to the step 340, and again determines if there is a DTMF code sent by the transmitter.

If there is a DTMF code from the transmitter, the CPU 20 determines (S370) whether or not the input DTMF code and the current password correspond. The CPU 20 completes the program if the input DTMF code and the current password do not correspond, and it sets (S380) a timer 2. The checking time of the timer 2 is 20 to 30 seconds.

Subsequently, the CPU 20 controls (S390) the corresponding section, and transmits a dummy ring to it at a selected volume and sends back a dummy ring-back tone to the transmitter. The CPU 20 then detects if the facsimile's control circuitry has placed an off-hook condition on the telephone line. If so, the CPU 20 converts (S440) the current mode to a voice communication mode, and if it determines that it does not place an off-hook condition has not occurred, it checks for the generation of a CNG signal.

If the generation of the CNG signal is detected, the CPU 20 converts (S430) the current mode to a facsimile mode, and if the CNG signal is not detected, the CPU 20 determines (S420) if the time measured by the timer 2 is over. If so, the CPU 20 completes the program. If the output does not result therefrom, the CPU 20 returns to the step 390, and a dummy ring is transmitted to the corresponding section at a selected volume.

The present invention enables a receiving-side facsimile machine to be in a personal reception mode, and has the capability to emit ringing signals only when messages from transmitters selected by a receiver come into the receiving set, or to selectively receive printed messages. Therefore, the present invention may prevent an invasion of a user's privacy.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of controlling a ring volume and selectively receiving messages by facsimile in a facsimile machine, comprising:

determining if there is a key input for establishing a personal reception mode;

if it has been determined that there is a key input for establishing a personal reception mode, determining if a ring volume control has been requested;

if it has been determined that a ring volume control has not been requested, then setting the ring volume to the previously set value and if it has been determined that the ring volume has been requested, then setting the ring volume to a value set by a user;

determining if there is a recorded reception password;

if it has been determined that there is no recorded reception password, then recording an input password from the user;

if it has been determined that there is a recorded reception password, determining if there is a change of password requested;

if it has been determined that there is a change of password requested, then recording an input new password from the user;

determining if an incoming call has been received;

if it has been determined that an incoming call has been received, determining if a personal reception mode has been established;

if it has been determined that a personal reception mode has been established, then seizing a corresponding telephone line and setting a timer 1 to a first predetermined time period;

determining if a dual tone multi-frequency code has been sent by a transmitter which placed the incoming call;

if it has been determined that no dual tone multi-frequency code has been sent by the transmitter, determining if the time period measured by timer 1 is over;

if the time period measured by the timer 1 is over, then releasing the telephone line;

if it has been determined that a dual tone multi-frequency code has been sent by the transmitter, determining if the dual tone multi-frequency code and the recorded password correspond;

if it has been determined that the dual tone multi-frequency code and recorded password do not correspond, then releasing the telephone line;

if it has been determined that the dual tone multi-frequency code and recorded password correspond, then setting a timer 2 to a second predetermined time period and sending a dummy call at the previously selected ring volume;

determining if a telephone handset of the facsimile machine is off the hook;

if it has been determined that the telephone handset is off the hook, then placing the facsimile machine in a communication conversation mode;

if it has been determined that the telephone handset is not off the hook, then determining if a CNG signal has been detected;

if it has been determined that CNG signal has been detected, then placing the facsimile machine in a receiving mode for receiving a transmission from the transmitter;

if it has been determined that no CNG signal has been detected, then determining if the time measured by the timer 2 is over; and if it has been determined that the time measured by the timer 2 is not over, then returning to the step of sending a dummy call at the previously selected ring volume and alternatively if it has been determined that the time measured by timer 2 is over, then releasing the telephone line.

2. The method of claim 1, said first predetermined time period being in a range of 10 to 20 seconds.

3. The method of claim 1, the second predetermined period of time being in a range of 20 to 30 seconds.

4. An apparatus for controlling a ring volume and selectively receiving messages by facsimile in a facsimile machine, comprising:

a means for determining if there is a key input for establishing a personal reception mode;

a means for determining if a ring volume control has been requested if it has been determined that there is a key input for establishing a personal reception mode;

a means for setting the ring volume to the previously set value if it has been determined that a ring volume control has not been requested and setting the ring volume to a value set by a user if it has been determined that the ring volume has been requested;

a means for determining if there is a recorded reception password;

a means for recording an input password from the user if it has been determined that there is no recorded reception password;

a means for determining if there is a change of password requested if it has been determined that there is a recorded reception password;

a means for recording an input new password from the user if it has been determined that there is a change of password requested;

a means for determining if an incoming call has been received;

a means for determining if a personal reception mode has been established if it has been determined that an incoming call has been received;

a means for seizing a corresponding telephone line and setting a timer 1 to a first predetermined time period if it has been determined that a personal reception mode has been established;

a means for determining if a dual tone multi-frequency code has been sent by a transmitter which placed the incoming call;

a means for determining if the time period measured by timer 1 is over if it has been determined that no dual tone multi-frequency code has been sent by the transmitter;

a means for releasing the telephone line if the time period measured by the timer 1 is over;

a means for determining if the dual tone multi-frequency code and the recorded password correspond if it has been determined that a dual tone multi-frequency code has been sent by the transmitter;

a means for releasing the telephone line if it has been determined that the dual tone multi-frequency code and recorded password do not correspond;

a means for setting a timer 2 to a second predetermined time period and sending a dummy call at the previously selected ring volume if it has been determined that the dual tone multi-frequency code and recorded password correspond;

a means for determining if a telephone handset of the facsimile machine is off the hook;

a means for placing the facsimile machine in a communication conversation mode if it has been determined that the telephone handset is off the hook;

a means for determining if a CNG signal has been detected if it has been determined that the telephone handset is not off the hook;

a means for placing the facsimile machine in a receiving mode for receiving a transmission from the transmitter if it has been determined that a CNG signal has been detected;

a means for determining if the time measured by the timer 2 is over if it has been determined that no CNG signal has been detected; and a means for returning to the step in which said means for sending a dummy call at the previously selected ring volume operates if it has been determined that the time measured by the time 2 is not over and alternatively releasing the telephone line if it has been determined that the time measured by timer 2 is over.

5. The apparatus of claim 4, said first predetermined time period being in a range of 10 to 20 seconds.

6. The apparatus of claim 4, the second predetermined period of time being in a range of 20 to 30 seconds.

* * * * *